UNITED STATES PATENT OFFICE.

JOSEPH DEINET, OF ELBERFELD, GERMANY, ASSIGNOR TO FARBENFABRIKEN VORM. FRIEDR. BAYER & CO., OF ELBERFELD, GERMANY, A CORPORATION OF GERMANY.

VAT DYE.

957,041.  Specification of Letters Patent.  Patented May 3, 1910.

No Drawing. Application filed May 12, 1909, Serial No. 495,450. Renewed March 18, 1910. Serial No. 550,296.

*To all whom it may concern:*

Be it known that I, JOSEPH DEINET, citizen of the German Empire, residing at Elberfeld, Germany, have invented new and useful Improvements in Vat Dyes, of which the following is a specification.

My invention relates to the production of new anthracene derivatives. They are obtained by converting an aminoanthraquinone into its monobenzoylated derivative. The reaction is carried out by treating an aminoanthraquinone with benzoyl chlorid.

The new products are after being dried and pulverized colored powders practically insoluble in water; soluble in concentrated sulfuric acid with from a yellow to red to violet to brown color. They yield on treatment with hydrosulfite and caustic soda lye from orange to red to brown vats suitable for dyeing and printing the textile fiber from yellow to red to violet to brown shades. They also form valuable lakes.

In order to illustrate the new process I can proceed as follows, the parts being by weight:—10 parts of 1-aminoanthraquinone are heated to boiling for about half an hour with 100 parts of nitrobenzene and 20 parts of benzoyl chlorid. The new condensation product crystallizes from the cooling liquid in the shape of yellow needles which are filtered off and dried. It is soluble in pyridin with a yellow color, in concentrated sulfuric acid with an orange color. By treatment with hydrosulfite and NaOH a dark-red vat is obtained which dyes cotton wool or silk pure yellow shades.

Other aminoanthraquinones may be used. Products of similar qualities are thus obtained, e. g. monobenzoyl-2-aminoanthraquinone (dyes yellow), monobenzoyl-1.4-diaminoanthraquinone (dyes violet), monobenzoyl-1-amino-5-chloroanthraquinone (dyes yellow), monobenzoyl-1-amino-6-chloroanthraquinone (dyes yellow), monobenzoylated 1-amino-4-oxyanthraquinone (dyes bright blue-red), monobenzoylated 1-amino-4.5.8-trioxyanthraquinone (dyes red-violet), monobenzoyl-1-amino-4-methoxyanthraquinone (dyes bright ponceau-red), 1-monobenzoyl-amino-2-methylanthraquinone (dyes yellow), 1-monobenzoylamino-5-aminoanthraquinone (dyes red), 1-monobenzoylamino-4-methylaminoanthraquinone (dyes blue), 1-monobenzoylamino - 5 - methylaminoanthraquinone (dyes bordeaux), 1-monobenzoylamino-5-dimethylaminoanthraquinone (dyes red), 1-monobenzoylamino-5-para-toluidoanthraquinone (dyes brown), 1-monobenzoylamino-4-chloroanthraquinone (dyes yellow), 1-monobenzoylamino-2-methyl-4-chloroanthraquinone (dyes yellow), 1-monobenzoylamino-4-nitroanthraquinone (dyes violet), 1-monobenzoylamino-5-nitroanthraquinone (dyes orange-red), monobenzoylated 1-amino-5-oxy-anthraquinone (dyes yellow), monobenzoylated-1-amino-2-bromo-4-oxyanthraquinone (dyes yellow), monobenzoylated-1-amino-3-bromo-4-oxyanthraquinone (dyes bluish-red), 1-monobenzoylamino-4-phenoxyanthraquinone (dyes yellow).

I claim:—

1. The herein described new vat dyestuffs of the anthracene series which can be obtained from benzoyl chlorid and an aminoanthraquinone, which dyestuffs are, after being dried and pulverized, colored powders practically insoluble in water, soluble in concentrated sulfuric acid with a yellow to red to violet to brown color; giving from orange to red to brown vats with hydrosulfite and caustic soda lye, which vats dye the textile fiber from yellow to red to violet to brown shades, substantially as described.

2. The herein described new vat dyestuff of the anthracene series which is the 1-benzoylaminoanthraquinone, which dyestuff is, after being dried and pulverized, a yellow powder which is soluble in pyridin with a yellow color; soluble in concentrated sulfuric acid with an orange color; giving a dark-red vat with hydrosulfite and caustic soda lye, which vat dyes the textile fiber beautiful yellow shades, substantially as described.

In testimony whereof I have hereunto set my hand in the presence of two subscribing witnesses.

JOSEPH DEINET. [L. S.]

Witnesses:
 OTTO KÖNIG,
 C. J. WRIGHT.